Figure 1:
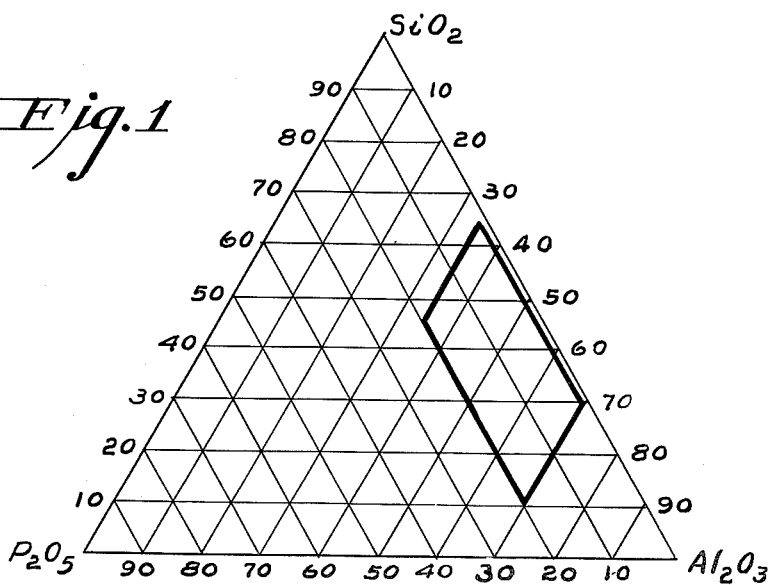

INVENTOR.
JOHN F. MacDOWELL
BY Clarence R. Patty Jr.
ATTORNEY

INVENTOR.
JOHN F. MacDOWELL
BY
Clarence R. Patty, Jr.
ATTORNEY

Feb. 22, 1966    J. F. MacDOWELL    3,236,662
SEMICRYSTALLINE BODY AND METHOD OF MAKING IT
Filed March 19, 1962    6 Sheets-Sheet 4

INVENTOR.
JOHN F. MAC DOWELL
BY
Clarence R. Patty Jr.
ATTORNEY

Feb. 22, 1966     J. F. MacDOWELL     3,236,662
SEMICRYSTALLINE BODY AND METHOD OF MAKING IT
Filed March 19, 1962     6 Sheets-Sheet 5

INVENTOR.
JOHN F. MacDOWELL
BY
*Clarence R. Patty, Jr.*
ATTORNEY

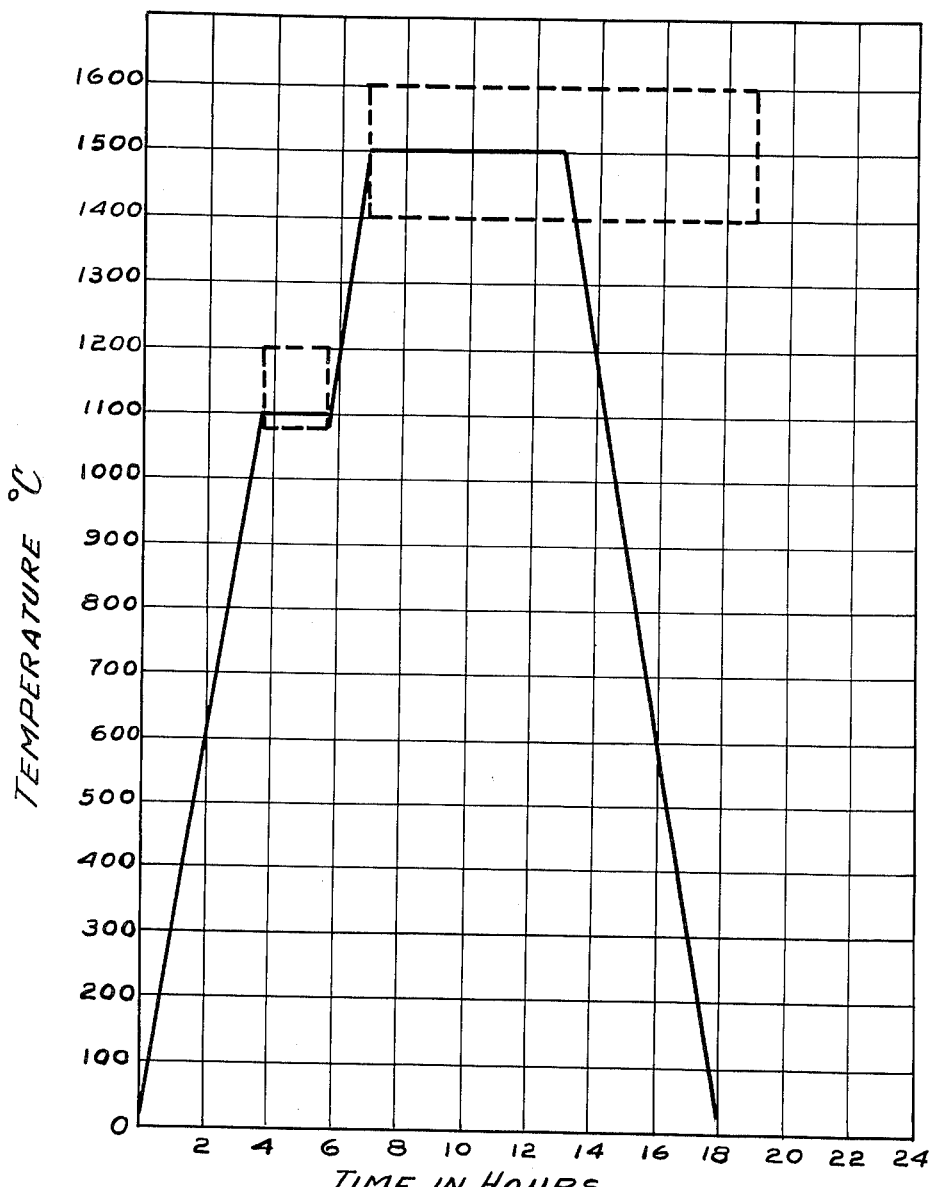

# United States Patent Office 3,236,662
Patented Feb. 22, 1966

3,236,662
SEMICRYSTALLINE BODY AND METHOD OF MAKING IT
John F. MacDowell, Painted Post, N.Y., assignor to Corning Glass Works, Corning, N.Y., a corporation of New York
Filed Mar. 19, 1962, Ser. No. 180,572
7 Claims. (Cl. 106—39)

This invention relates to glass-ceramic bodies which are dense, strong, resistant to thermal shock, and have such a high softening point as to make them eminently suitable for many high temperature applications, such as furnace walls, rocket nose cones, heat exchangers, and the like.

Within the past few years, the glass industry has discovered that exceptional products can be had through the controlled crystallization of a glass body, thereby yielding what has generally been termed a semicrystalline body. This discovery has opened an entirely new field of ceramics which has been denominated glass-ceramics. The process usually comprises a special heat treatment of a glass shape which induces the formation of very small internal crystals. In some cases, a chemical may be added to the glass batch to act as a nucleator for crystal growth. With a careful heating schedule, a dense, strong, ceramic-like material can be produced directly from the glass. Because it is first a glass, the new material can be formed into almost any shape by blowing, pressing, spinning, or drawing. Some types can even be cast like metals. Finally, because the crystallization is carefully controlled within a glass shape, a substantially homogeneous body of fine crystals can be produced which is substantially free of voids and non-porous. This is in direct contra-distinction to the typical fused cast ceramic body which usually contains many voids and is coarse grained.

Recent applications for dense, uniform, high temperature ceramic materials that can be formed into various intricate shapes have severely taxed the conventional ceramic techniques and have created a rich potential for glass-ceramic materials and methods.

It has been learned that substantially all glasses high in alumina tend to devitrify when held for an appreciable time at a temperature slightly below their liquidus temperatures, but the rate of the devitrification depends in large measure upon glass composition, at any given constant percentage of alumina. Binary aluminate compositions, e.g., calcium aluminate and aluminum phosphate, can be quenched to glasses only with considerable difficulty. Binary aluminosilicate glasses containing more than about 30 weight percent of alumina are very unstable, i.e., tend to devitrify readily when cooled from the melt. However, because the refractoriness of compounds containing substantial amounts of alumina, such as mullite, is so high, their presence would be extremely desirable. I have found that at least 35 weight percent of alumina is necessary in an alumina-silica glass batch to insure a substantial crystallization of mullite and/or other high-alumina crystal phases. Therefore, to be of practical value as a refractory material, the glass should contain at least 35 weight percent of alumina. This invention concerns the crystallization of refractory compounds from glasses, particularly where a high alumina compound forms the predominant crystalline phase, and wherein no nucleating agent need be utilized.

The principal object of this invention is to provide a glass-ceramic body capable of being used at high temperatures, i.e., at temperatures of 1400° C. and higher, consisting essentially of alumina and silica which is also strong, dense, and resistant to thermal shock.

Another object of this invention is to provide a method of making such a glass-ceramic body which is relatively simple in operation and economical in practice.

Still another object of. this invention is to provide such a method wherein presently available apparatus and known techniques can be used to practice the invention, thereby obtaining the inherent economics and efficiencies resulting from using known processes.

I have discovered that the addition of a controlled amount of certain modifying agents to alumina-silica batches will produce stable glasses containing up to 70 weight percent of alumina which, when given a unique heat treatment, will form a crystalline body containing mullite and/or other high alumina phases and will be useful at temperatures to 1400° C. and higher.

As noted above, binary, high-alumina, aluminosilicate glasses are very unstable. Generally, mullite and beta-cristobalite are the phases present. Beta-cristobalite is an undesirable component when the alpha-beta cristobalite inversion occurs during the cooling of the body. This inversion commonly causes the crystalline structure to break up. Hence, the modifying agents which are added to the glass batch must perform two functions: (1) depress the normal devitrification tendencies of the binary system and produce a relatively stable glass which can be crystallized later by a controlled heat treatment, and (2) inhibit the formation or inversion of cristobalite. I have found compositions in aluminosilicate systems containing phosphorous pentoxide ($P_2O_5$) and/or the basic metal oxides lithia ($Li_2O$), soda ($Na_2O$), potassia ($K_2O$), rubidia ($Rb_2O$), cesia ($Cs_2O$), lime (CaO), strontia (SrO), baria (BaO), and lanthana ($La_2O_3$), wherein the $P_2O_5$ may vary from 1–20% by weight, the $Li_2O$ may vary from 1–5% by weight, the $Na_2O$ may vary from 4–10% by weight, the $K_2O$ may vary from 1–15% by weight, the $Rb_2O$ may vary from 4–25% by weight, the $Cs_2O$ may vary from 4–15% by weight, the CaO may vary from 4–10% by weight, the SrO may vary from 4–10% by weight, the BaO may vary from 4–40% by weight, and the $La_2O_3$ may vary from 4–20% by weight, the total amount of such modifiers not exceeding about 40% by weight, to be very satisfactory from the standpoint of glass and glass-ceramic quality and stability.

I have further found that a fourth substance, such as the refractory oxides zirconia ($ZrO_2$), thoria ($ThO_2$), magnesia (MgO), and beryllia (BeO), can, if desired, be added to the glass-forming batch in amounts up to a total of about 40 weight percent which will precipitate a crystal phase compatible with mullite, thereby altering the physical properties as compared to the ternary system. $ZrO_2$ may be present up to 25% by weight, $ThO_2$ present up to 30% by weight, MgO present up to 20% by weight, and BeO up to 10% by weight. For example, the addition of $ZrO_2$ to the $BaO \cdot Al_2O_3 \cdot SiO_2$ system results in the precipitation of baddeleyite in association with the mullite and substantially increases the strength of the body and improves its dielectric properties.

In the following examples, the batches were ball milled to obtain more efficient melting and better glass homogeneity and then melted at 1800°–1900° C. in crucibles, pots, or tanks, depending upon the size of melt desired. The melts were poured into molds, generally fabricated from steel, cooled in air until fairly rigid, introduced into an annealer maintained at 850° C. to 950° C., and then cooled very slowly to room temperature, thus forming bodies of glass. These glass articles were then placed in a furnace and heated at the rate of about 5° C. per minute up to about 1000°–1200° C. and held in the temperature range for about 2 hours, in order to initiate crystallization. It will be understood this rate of heating is purely arbitrary and is chosen to protect the glass shape from thermal shock and deformation. The rate of heating must not be so rapid as to cause breakage of the glass or excessive deformation. The temperature of the furnace was then raised at about 5° C. per minute to about 1400°–1600° C. and held in that temperature range for about 6–12 hours to obtain the desired crystallization. The crystallization of the glass during the reheating cycle proceeds more rapidly as the temperature approaches the liquidus of the crystalline phase. However, in the early stages of crystallization, the proportion of glassy matrix is large and the article is deformable if its temperature is raised too rapidly. I have found that a rate of increase not over about 5° C./minute gives satisfactory results in most instances. Finally, the crystalline articles were then cooled to room temperature. The rate of cooling to room temperature is dependent upon the body's resistance to thermal shock. Although more rapid cooling has been practiced, we prefer to employ a 5° C./minute cooling cycle. Frequently the heat to the furnace is merely cut off and the furnace allowed to cool at its own rate with the bodies therein.

Where more efficient and economical use of heat is desired, the specified heat treatments may be carried out following the shaping of the plastic glass while it is still hot, rather than cooling to room temperature and subsequently reheating. Thus, after pouring the melt into a mold, or forming the desired shape in any other conventional manner, the body can be rapidly cooled to a temperature below the transformation point, i.e., the temperature at which the liquid glass is considered to become a solid, this temperature being in the vicinity of the annealing point of the glass (for glasses of this invention, a temperature of about 850°–950° C.) and the required heat treating schedule then followed.

Furthermore, I have learned that very satisfactory crystalline bodies can be produced where a two-step heat treatment is replaced with a gradual, but constant, increase in temperature from room temperature or just below the transformation point. This modification in method allows a continuous-type operation. Experience has shown this rate of heating to be dependent upon the thermal character of the glass and the size of the shape involved. Obviously, a rapid rate of heating would be desirable from a commercial standpoint and the low thermal expansion coefficient of our materials has in many cases permitted relatively rapid heating to be pursued. However, as noted above, the rate of temperature increase must be in accord with the rate of crystallization, otherwise, deformation due to a lowering of viscosity will render the final crystalline product generally of little use. Therefore, I prefer a temperature increase of about 5° C./minute to insure dense crystallization with little, if any, deformation as the body is heated above the softening point of the glass. Nevertheless, heating rates of 10° C./minute and 20° C./minute and even higher have given useable bodies, particularly if some physical support is given to them. It is apparent, of course, that a very slow increase in temperature will also give a satisfactory crystalline product.

Finally, although my preferred practice entails a two-step heating process with a lower heating range of about 1000°–1200° C. maintained for about 1–4 hours, preferably 2 hours, to initiate crystallization, followed by a higher heating range of 1400°–1600° C., maintained for about 6–12 hours, I have discovered that a useable body can be formed where the glass shape is raised to only just above the transformation point, say 1000° C., and held thereat for a long period of time, say 24 hours and even longer, until the desired crystallization is attained. If a higher constant temperature is used, the crystallization rate is more rapid and the crystals larger. Here again, the rate of crystallization should preferably substantially balance the rate of deformation of the glass body, i.e., the viscosity of the body cannot be permitted to drop appreciably.

My preferred practice contemplates a staggered heat treating schedule, as total deformation is less where a short hold at a lower temperature is used to begin the heating schedule.

From the foregoing, it can readily be seen that my invention, in its simplest terms, involves three steps: (1) melting the batch; (2) cooling the melt below the transformation point; and (3) reheating the glass shape at least to about 1000° C., but not more than about 1600° C., and holding thereat until the desired crystallization is attained.

Table I lists examples produced through our preferred embodiment having compositions of glasses falling within the aforementioned ranges calculated from their respective batches on the oxide basis in weight percent, exclusive of impurities which may be present in the batch materials, as well as the melting temperatures. Therefore the batch may be comprised of any materials, either oxides or other compounds, which, on being fused together, are converted to the desired oxide composition in the desired proportions. Table II is a tabulation of the reheating schedule, description of the body, crystal phases present (as determined by X-ray diffraction methods), and some thermal expansion and density measurements.

*Table I*

|  | 1 | 2 | 3 | 4 | 5 | 6 | 7 | 8 |
|---|---|---|---|---|---|---|---|---|
| Al₂O₃ | 40 | 40 | 40 | 44 | 40 | 40 | 40 | 45 |
| SiO₂ | 56 | 50 | 45 | 52 | 55 | 50 | 45 | 40 |
| K₂O | 4 | 10 | 15 | 4 |  |  |  |  |
| Rb₂O |  |  |  |  | 5 | 10 | 15 | 15 |
| Melting Temp., °C | 1,900 | 1,800 | 1,850 | 1,900 | 1,850 | 1,850 | 1,850 | 1,850 |

|  | 9 | 10 | 11 | 12 | 13 | 14 | 15 | 16 |
|---|---|---|---|---|---|---|---|---|
| Al₂O₃ | 40 | 40 | 40 | 45 | 40 | 40 | 45 | 45 |
| SiO₂ | 55 | 50 | 45 | 45 | 50 | 45 | 45 | 40 |
| Cs₂O | 5 | 10 | 15 | 10 |  |  |  |  |
| BaO |  |  |  |  | 10 | 15 | 10 | 15 |
| Melting Temp., °C | 1,850 | 1,900 | 1,850 | 1,900 | 1,800 | 1,850 | 1,850 | 1,850 |

|  | 17 | 18 | 19 | 20 |
|---|---|---|---|---|
| Al₂O₃ | 45 | 40 | 45 | 40 |
| SiO₂ | 20 | 20 | 25 | 20 |
| K₂O | 3 |  |  |  |
| Cs₂O |  | 5 | 5 |  |
| BaO |  |  |  | 40 |
| ZrO₂ |  | 17 | 20 | 15 |
| P₂O₅ |  | 15 | 15 | 10 |
| Melting Temp., °C | 1,800 | 1,800 | 1,800 | 1,800 |

|  | 21 | 22 | 23 | 24 |
|---|---|---|---|---|
| Al₂O₃ | 40 | 50 | 40 | 60 |
| SiO₂ | 45 | 35 | 30 | 20 |
| K₂O |  | 2 |  |  |
| BaO | 10 |  |  | 2 |
| ZrO₂ |  |  | 20 | 2 |
| P₂O₅ |  |  | 10 | 16 |
| BeO | 5 |  |  |  |
| MgO |  |  | 13 |  |
| Melting Temp., °C | 1,800 | 1,850 | 1,800 | 1,900 |

|  | 25 | 26 | 27 | 28 | 29 | 30 |
|---|---|---|---|---|---|---|
| Al₂O₃ | 43 | 45 | 40 | 40 | 40 | 50 |
| SiO₂ | 55 | 50 | 50 | 50 | 45 | 40 |
| Li₂O | 2 |  |  |  |  |  |
| Na₂O |  | 5 |  |  |  |  |
| CaO |  |  | 10 |  |  |  |
| SrO |  |  |  | 10 |  |  |
| La₂O₃ |  |  |  |  | 15 |  |
| P₂O₅ |  |  |  |  |  | 10 |
| Melting Temp., °C | 1,800 | 1,850 | 1,800 | 1,800 | 1,800 | 1,800 |

Table II

| Sample No. | Reheat Schedule | Sample Description | Crystal Phases | Expansion Coeff.× $10^{-7}/°C.$ (25°–300° C.) | Density B |
|---|---|---|---|---|---|
| 1 | 1,120° C.—2 hr / 1,520° C.—6 hr | White, fine grained | Mullite | | |
| 2 | 1,100° C.—2 hr / 1,460° C.—8 hr | ----do---- | ----do---- | 51.9 | 2.604 |
| 3 | 1,110° C.—2 hr / 1,500° C.—6 hr | White, medium to coarse grained. | ----do---- | | |
| 4 | 1,120° C.—2 hr / 1,520° C.—6 hr | White, fine grained | ----do---- | | |
| 5 | 1,100° C.—2 hr / 1,510° C.—6 hr | ----do---- | ----do---- | | |
| 6 | 1,100° C.—2 hr / 1,495° C.—6 hr | ----do---- | ----do---- | | |
| 7 | 1,100° C.—2 hr / 1,495° C.—6 hr | ----do---- | ----do---- | | |
| 8 | 1,100° C.—2 hr / 1,495° C.—6 hr | ----do---- | Mullite / $Rb_2O·Al_2O_3·4SiO_2$ | | |
| 9 | 1,100° C.—2 hr / 1,510° C.—6 hr | ----do---- | Mullite | | |
| 10 | 1,090° C.—2 hr / 1,500° C.—8 hr | ----do---- | ----do---- | 33.5 | 2.824 |
| 11 | 1,095° C.—2 hr / 1,490° C.—6 hr | ----do---- | ----do---- | 40.1 | |
| 12 | 1,100° C.—2 hr / 1,500° C.—6 hr | ----do---- | ----do---- | | |
| 13 | 1,100° C.—2 hr / 1,535° C.—12 hr | ----do---- | ----do---- | 35.6 | 2.842 |
| 14 | 1,090° C.—2 hr / 1,500° C.—8 hr | ----do---- | ----do---- | 37.8 | 2.960 |
| 15 | 1,090° C.—2 hr / 1,500° C.—8 hr | ----do---- | ----do---- | 38.5 | 2.928 |
| 16 | 1,110° C.—2 hr / 1,500° C.—6 hr | ----do---- | Mullite / $BaO·Al_2O_3·2SiO_2$ | | |
| 17 | 1,100° C.—2 hr / 1,500° C.—8 hr | ----do---- | $ZrO_2$ / Mullite | 84.5 | 3.019 |
| 18 | 1,100° C.—2 hr / 1,500° C.—8 hr | ----do---- | $ZrO_2$ / Mullite | 100.6 | 3.084 |
| 19 | 1,120° C.—2 hr / 1,465° C.—6 hr | ----do---- | Mullite | | |
| 20 | 1,100° C—1¾ hr / 1,500° C.—4½ hr | ----do---- | $BaO·Al_2O_3·2SiO_2$ | 69.3 | |
| 21 | 1,000° C.—2 hr / 1,500° C.—6 hr | ----do---- | Mullite / $BeO·Al_2O_3$ | | |
| 22 | 1,120° C.—2 hr / 1,460° C.—6 hr | ----do---- | Mullite / $MgO·Al_2O_3$ | | |
| 23 | 1,100° C.—2 hr | White, fine to medium grained. | Mullite / $ZrO_2$ | | |
| 24 | 1,120° C.—2 hr / 1,515° C.—6 hr | White, fine grained | Mullite | | |
| 25 | 1,100° C.—2 hr / 1,450° C.—6 hr | ----do---- | ----do---- | 37.2 | 2.656 |
| 26 | 1,095° C.—2 hr / 1,490° C.—6 hr | ----do---- | ----do---- | 45.9 | |
| 27 | 1,100° C.—2 hr / 1,450° C.—6 hr | ----do---- | ----do---- | | |
| 28 | 1,100° C.—2 hr / 1,535° C.—12 hr | ----do---- | ----do---- | 38.5 | |
| 29 | 1,100° C.—2 hr / 1,500° C.—6 hr | ----do---- | ----do---- | | |
| 30 | 1,100° C.—2 hr / 1,450° C.—6 hr | ----do---- | ----do---- | | |

The above tables demonstrate that crystalline bodies containing mullite and/or other high alumina phases can be obtained from high alumina, aluminosilicate glasses where a minor amount of a modifying agent is added. Modulus of rupture measurements averaged somewhat over 10,000 p.s.i. for the crystalline bodies.

The quantities of alumina and modifier present are critical to the invention. I have learned that at least about 35 weight percent of $Al_2O_3$ must be present to insure a substantial crystallization of mullite and/or other high alumina materials but a stable glass cannot be formed where more than about 70 weight percent of $Al_2O_3$ is present. At least the minimum amount stated of the modifying agents must be available to produce a stable glass and inhibit the formation of cristobalite, but where more than the designated amount of each (or more than a total of 40 weight percent of a combination of them) is introduced, crystals are formed which are incompatible with the mullite and other high alumina phases. This incompatibility may involve a great difference in the coefficients of thermal expansion between the high alumina crystallization and that of the extraneous phase introduced with an excess of a modifying agent, such that the body will be disrupted during the heat treatment. This incompatibility may also invole the formation of large crystals of the extraneous phase during heat treatment such that the desired fine-grained structure which insures high strength and density in the final product, is not possible.

Likewise, the amounts of the refractory oxides which can be tolerated must be strictly observed to insure the production of a stable glass followed by the formation of crystals compatible with the high alumina phases upon heat treatment. Finally, I have found that while as much as 64 weight percent of $SiO_2$ may be present, at least 10 weight percent must be present to insure glass stability.

As has been explained above, no separate nucleating agent as such is required for my invention. The crystals formed are small, substantially all being finer than 30 microns, and randomly oriented. Laboratory tests have indicated the crystal content of the body to be at least 25% by weight and generally over 30% by weight, this depending upon the extent to which components of the batch are adaptable to the formation of crystalline phases. Moreover, as can be seen from Tables I and II, my invention provides dense, strong bodies which are resistant to thermal shock and which are useable at temperatures over 1400° C. Being formed from a non-porous glass, the final crystalline body is non-porous, thereby greatly increasing its resistance to molten substances or gases with which it may be brought into contact.

Figure 2:
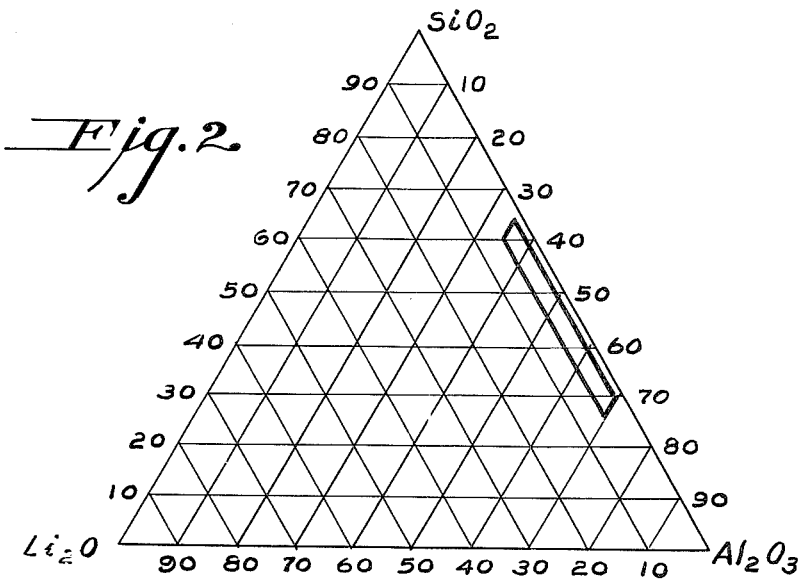
Figure 3:
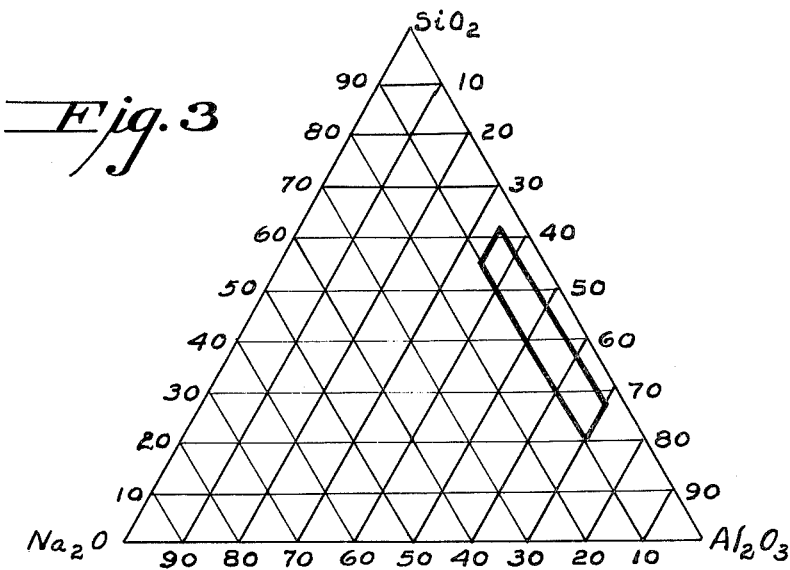
Figure 4:
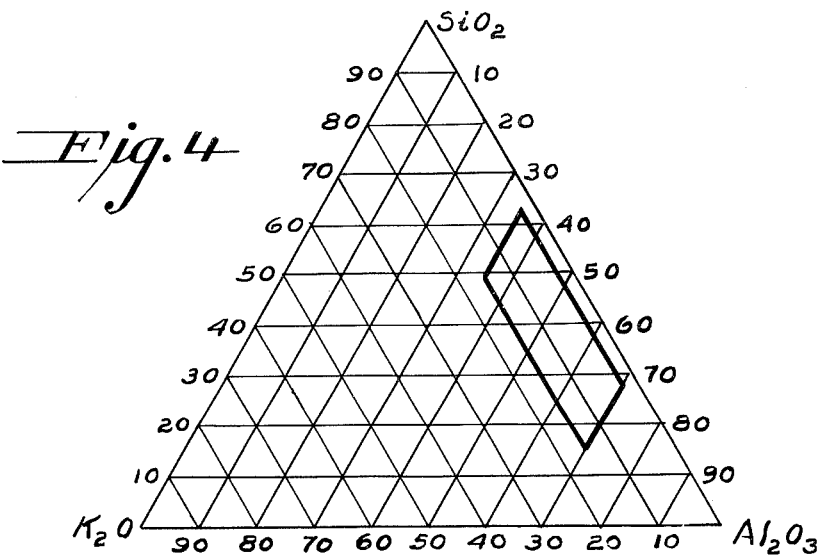
Figure 5:
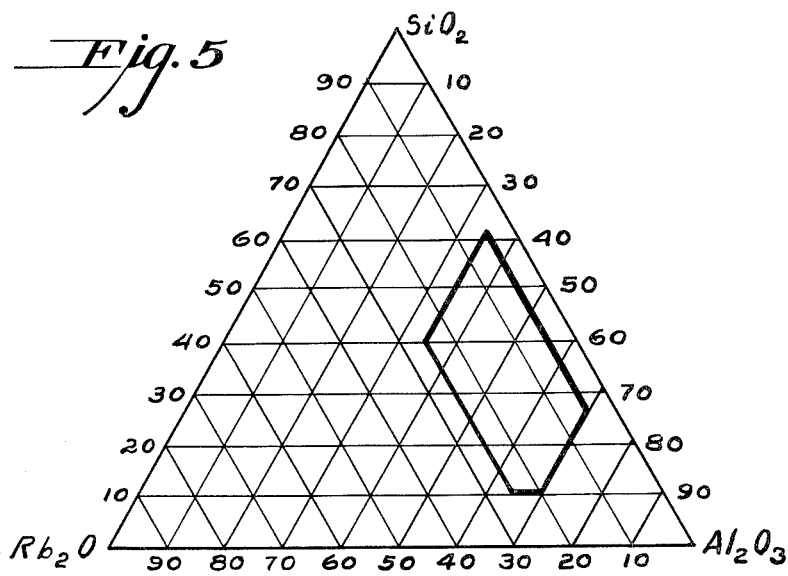
Figure 6:
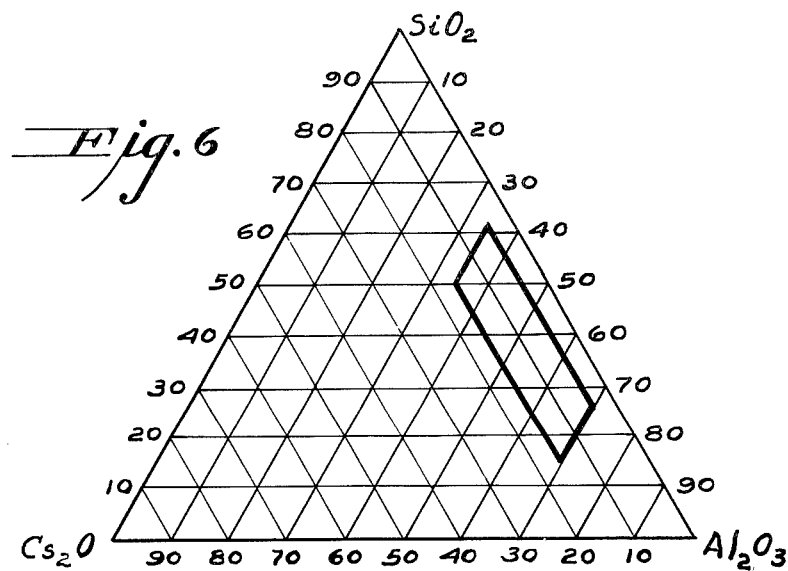
Figure 7:
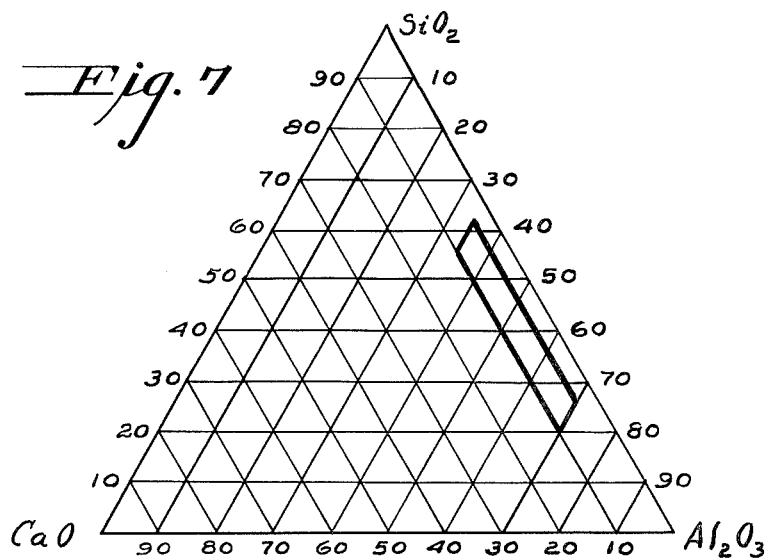
Figure 8:
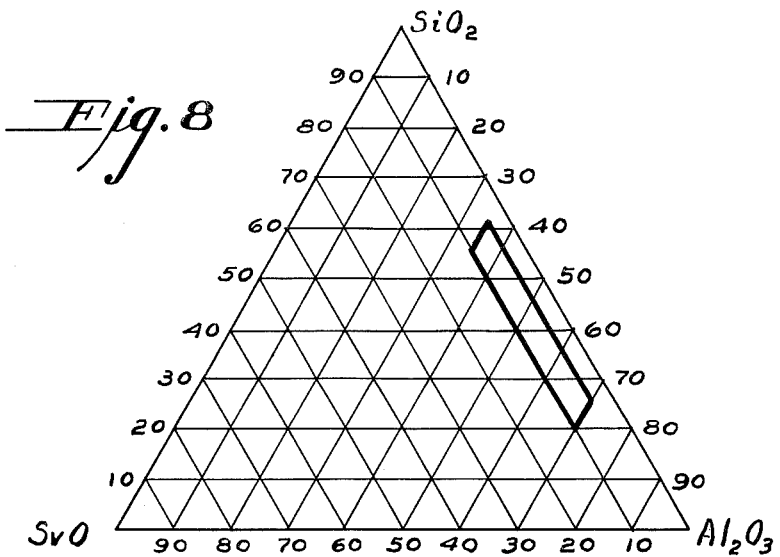
Figure 9:
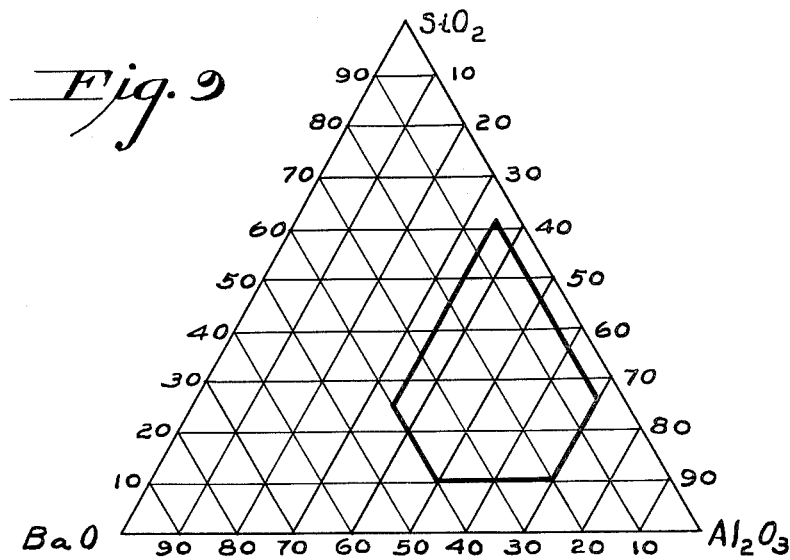
Figure 10:
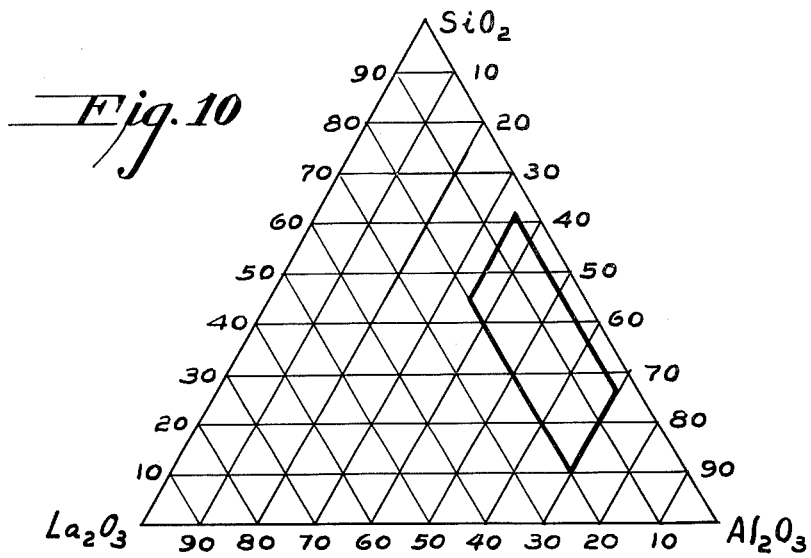

FIGS. 1–10 illustrate the ranges of the fundamental three-component compositions encompassed in my invention wherein FIG. 1 includes $P_2O_5$ as the modifying agent;

FIG. 2 includes $Li_2O$ as the modifying agent; FIG. 3 includes $Na_2O$ as the modifying agent; FIG. 4 includes $K_2O$ as the modifying agent; FIG. 5 includes $Rb_2O$ as the modifying agent; FIG. 6 includes $Cs_2O$ as the modifying agent; FIG. 7 includes CaO as the modifying agent; FIG. 8 includes SrO as the modifying agent; FIG. 9 includes BaO as the modifying agent; and FIG. 10 includes $La_2O_3$ as the modifying agent.

FIG. 11 records a time-temperature curve for the heat treatment of a specific example of my invention, viz., Example 12 recorded in Table II wherein after the glass-forming batch had been melted, shaped, and cooled to room temperature, the shape was given the following heat treatment: the temperature was raised at 5° C./minute to 1100° C., maintained thereat for 2 hours, thereafter the temperature was raised at 5° C./minute to 1500° C., held thereat for 6 hours, and then the body was cooled at 5° C./minute to room temperature. The area enclosed within the dotted lines represents the ranges of time and temperature of my preferred two-step process.

What is claimed is:

1. A semicrystalline ceramic body capable of withstanding high temperatures consisting essentially of a multiplicity of inorganic crystals dispersed in a glassy matrix, said crystals being formed by crystallization in situ from a glass body consisting, by weight, of about 35–70% $Al_2O_3$, about 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding about 40%, and up to about 40% of a refractory oxide in the indicated proportion selected from the group consisting of 0–25% $ZrO_2$, 0–30% $ThO_2$, 0–20% MgO, and 0–10% BeO, and combinations thereof, said glassy matrix consisting essentially of the uncrystallized portion of the glass remaining after crystallization of said crystals.

2. A semicrystalline ceramic body according to claim 1 wherein said crystals are predominantly high alumina compounds.

3. A semicrystalline ceramic body capable of withstanding high temperatures consisting essentially of a multiplicity of inorganic crystals dispersed in a glassy matrix, said crystals being formed by crystallization in situ from a glass body consisting, by weight, of about 35–70% $Al_2O_3$, about 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding about 40%, and up to about 40% of a refractory oxide in the indicated proportion selected from the group consisting of 0–25% $ZrO_2$, 0–30% $ThO_2$, 0–20% MgO, and 0–10% BeO, and combinations thereof, substantially all of said crystals being smaller than 30 microns in diameter and comprising at least 25% by weight of said semicrystalline body, said glassy matrix consisting essentially of the uncrystallized portion of the glass remaining after crystallization of said crystals.

4. A method of manufacturing a semicrystalline ceramic body capable of withstanding high temperatures which comprises the steps of melting a glass-forming composition consisting, by weight, of about 35–70% $Al_2O_3$, about 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding about 40%, and up to about 40% of a refractory oxide in the indicated proportion selected from the group consisting of 0–25% $ZrO_2$, 0–30% $ThO_2$, 0–20% MgO, and 0–10% BeO, and combinations thereof, simultaneously cooling the melt below the transformation point of said melt and forming a glass shape therefrom, exposing said shape to a temperature of at least about 1000° C., but not more than about 1600° C., maintaining thereat for a time sufficient to attain the desired crystallization, and thereafter cooling said shape to room temperature.

5. A method of manufacturing a semicrystalline ceramic body capable of withstanding high temperatures which comprises the steps of melting a glass-forming composition consisting, by weight, of about 35–70% $Al_2O_3$, about 10–60% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding about 40%, and up to about 40% of a refractory oxide in the indicated proportion selected from the group consisting of 0–25% $ZrO_2$, 0–30% $ThO_2$, 0–20% MgO, and 0–10% BeO, and combinations thereof simultaneously cooling the melt below the transformation point of said melt and forming a glass shape therefrom, increasing the temperature of said shape at a rate whereby the rate of crystallization substantially balances the rate of deformation of said shape to at least about 1000° C., but not more than about 1600° C., maintaining thereat for a time sufficient to attain the desired crystallization, and thereafter cooling said shape to room temperature.

6. A method according to claim 5 wherein said rate of heating is about 5° C./minute.

7. A method of manufacturing a semicrystalline ceramic body capable of withstanding high temperatures which comprises the steps of melting a glass forming composition consisting, by weight, of about 35–70% $Al_2O_3$, about 10–64% $SiO_2$, at least one modifying oxide in the indicated proportion selected from the group consisting of 1–20% $P_2O_5$, 1–5% $Li_2O$, 4–10% $Na_2O$, 1–15% $K_2O$, 4–25% $Rb_2O$, 4–15% $Cs_2O$, 4–10% CaO, 4–10% SrO, 4–40% BaO, and 4–20% $La_2O_3$, the total of said modifying oxides not exceeding about 40%, and up to about 40% of a refractory oxide in the indicated proportion selected from the group consisting of 0–25% $ZrO_2$, 0–30% $ThO_2$, 0–20% MgO, and 0–10% BeO, and combinations thereof, simultaneously cooling the melt below the transformation point of said melt and forming a glass shape therefrom, exposing said shape to a temperature range of about 1000°–1200° C., maintaining thereat for about 1–4 hours, raising the temperature of said shape to about 1400°–1600° C., maintaining thereat for about 6–12 hours, and thereafter cooling to room temperature.

References Cited by the Examiner

UNITED STATES PATENTS

| | | | |
|---|---|---|---|
| 2,876,120 | 3/1959 | Machlan | 106—39 |
| 2,920,971 | 1/1960 | Stookey | 106—39 |
| 3,117,881 | 1/1964 | Henry et al. | 106—39 |

OTHER REFERENCES

Levin et al.: Phase Diagrams for Ceramicists, pub. 1956 by Amer. Cernic. Soc. (FIGS. 116–118).

TOBIAS E. LEVOW, *Primary Examiner.*